No. 790,476. PATENTED MAY 23, 1905.
B. BORLAND.
PNEUMATIC SPRING.
APPLICATION FILED OCT. 17, 1904.
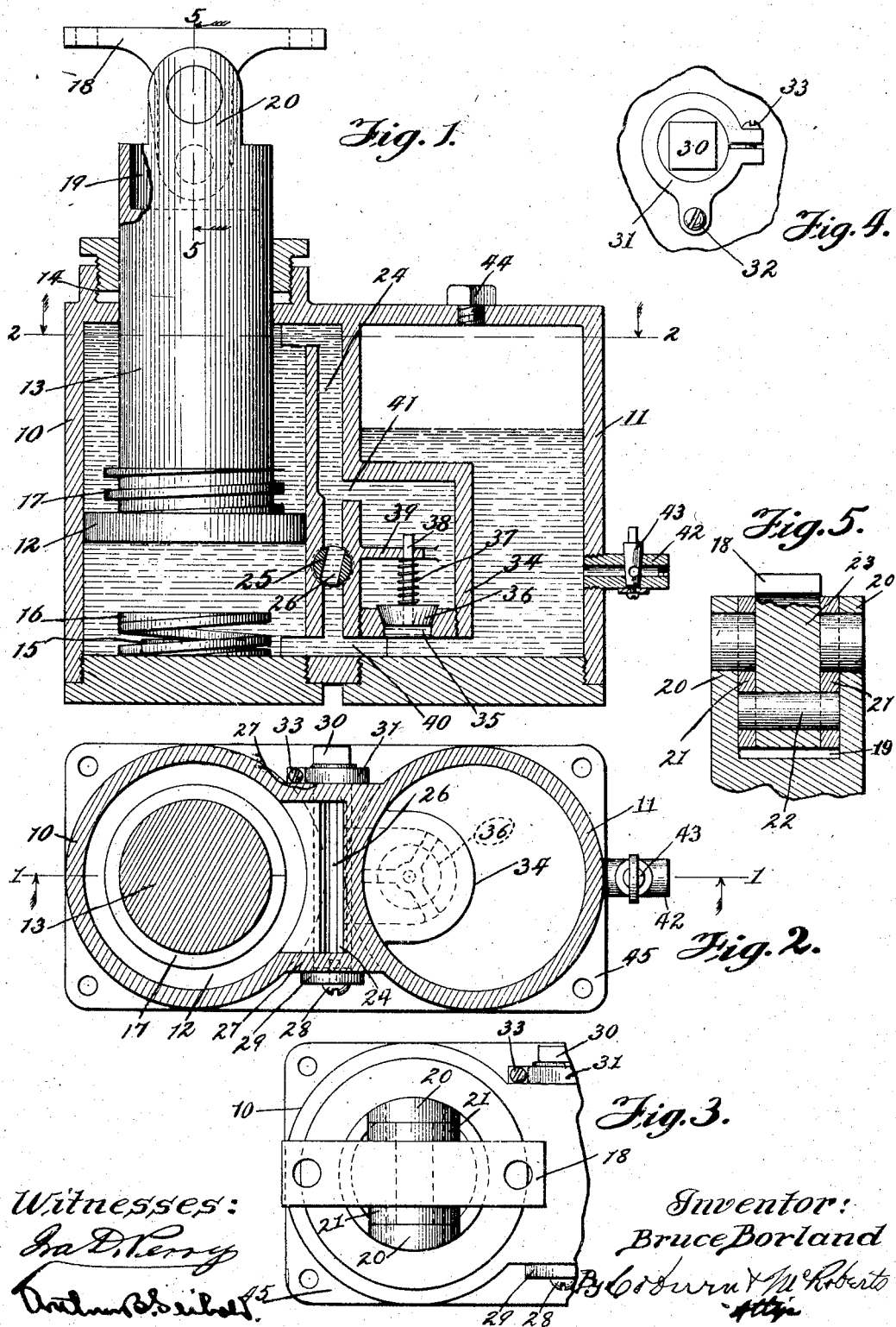
Witnesses:
Inventor:
Bruce Borland No. 790,476.

Patented May 23, 1905.

UNITED STATES PATENT OFFICE.

BRUCE BORLAND, OF CHICAGO, ILLINOIS.

PNEUMATIC SPRING.

SPECIFICATION forming part of Letters Patent No. 790,476, dated May 23, 1905.

Application filed October 17, 1904. Serial No. 228,752.

*To all whom it may concern:*

Be it known that I, BRUCE BORLAND, a citizen of the United States, residing at Chicago, in the county of Cook and State of Illinois, have invented certain new and useful Improvements in Pneumatic Springs, of which the following is a specification, reference being had therein to the accompanying drawings.

My invention relates to improvements in springs, and has particular reference to a pneumatic spring especially designed for use with carriages, wagons, automobiles, railway-cars, and other vehicles.

The object of the invention is to provide a spring of this character which reduces to a minimum sudden jolts or jars over rough or uneven roads and insures an even motion to the vehicle, &c., with which the spring is employed.

The invention consists in the combinations and arrangements of parts hereinafter described, and pointed out in the appended claims.

In the accompanying drawings, Figure 1 is a vertical longitudinal section of a pneumatic spring constructed in accordance with my invention, the section being taken on the line 1 1 of Fig. 2. Fig. 2 is a section on the line 2 2 of Fig. 1. Fig. 3 is a plan view of a portion of the device. Fig. 4 is a detail view of the valve-holding clamp, and Fig. 5 is a section on the line 5 5 of Fig. 1.

Referring to the drawings, 10 indicates a fluid-chamber, and 11 an air-cushion chamber. While I have shown in the present instance the chambers 10 and 11 as formed from a single casting, it is to be understood that this is not material and that they may be made in any other preferred form. The chambers 10 and 11 are shown as cylindrical in cross-section and may be of any suitable dimensions, which dimensions will depend upon the conditions under which the spring is to be employed—that is to say, the weight of the load to be supported, &c. Located in the chamber 10 is a piston 12, preferably fitting the wall of the chamber and provided with an enlarged stem 13, which passes vertically through the top of the said chamber, a suitable packing, such as 14, being employed to prevent leakage of the fluid designed to be contained in the chamber 10. It is obvious that owing to the stem 13 the opposite faces of the piston 12 have differential areas. The bottom of the chamber 10 is provided with a boss 15 to maintain in position a coiled spring 16, resting upon the bottom of the chamber about the boss 15. Coiled about the stem 13 is a spring 17, which rests upon the piston 12. The springs 16 and 17 are designed to react respectively against the bottom and top of the chamber 10 and serve to cushion the device in case of excessive or unusual jolts. The stem 13 is designed to be attached to some suitable part of a vehicle—such as the bottom of an automobile, wagon, &c.—and is provided with an attaching device, such as the plate 18. In order that the spring may adapt itself to the movements or swaying of the vehicle, the connection of the plate 18 and the stem 13 is of a yielding character. To this end the upper end of the stem 13 is provided with a recess 19 and a pair of lugs 20, located at opposite sides of the recess. Pivoted in suitable apertures in the lugs 20 are depending links 21, provided at their lower ends with alined apertures to receive a pivot-pin 22. The plate 18 is provided with a depending leg 23, which is pivoted on the pin 22.

A passage 24 communicates at its opposite ends with the chamber 10 at opposite sides of the piston 12. As shown in Fig. 2, this passage 24 is of considerable carrying capacity, being elongated in cross-section, as shown. A valve 25 is located in the passage 24 and is provided with an elongated port 26, adapted to register with the said passage. This valve is journaled at its ends in the webs 27, connecting the chambers 10 and 11 and forming the end walls of the passage 24, and at one end is held in position by a screw 28 passing through a washer 29, while the other end of the valve passes through the opposite web 27 and is provided with a rectangular head 30, adapted to receive a wrench or other device for turning the valve. The valve is held in its adjusted position by means of a split clip 31, secured to the adjacent web 27 by a screw 32 and clamped about the valve by a suitable device, such as a screw 33.

Located in the chamber 11 is a valve-casing 34, the bottom of which is provided with a port 35, opening from the chamber 11. This port 35 is closed by an upwardly-opening valve 36, which is adapted to be held upon its seat by a spring 37, coiled about the stem 38 of the valve and reacting between the valve and a web 39, through which the upper end of the stem 38 passes. A port 40 extends from the passage 24 at the point where the latter enters the chamber 10, and a port 41 enters the passage 24 beyond the valve 25, the passage 24 beyond the port 41 being enlarged, as shown. It will thus be seen that the two chambers 10 and 11 are in communication by the port 40 and that the lower end of the chamber 10 is in communication with the upper end of the chamber by the passage 24 and also by means of the auxiliary passage provided by the valve-casing 34 and ports 40 and 41. The chamber 11 is designed to contain a suitable supply of air to provide at its upper end an air-cushion. Air may be supplied through the medium of a charging-cock 42, controlled by a suitable valve 43, and the fluid is entered by way of a suitable port in the top of the chamber 11, closed by a plug 44. The spring is provided with a suitable apertured base 45, by means of which the spring may be attached to the running-gear or other suitable part of the vehicle with which the spring is employed. Preferably four of the pneumatic springs are employed with an ordinary vehicle, such springs being conveniently mounted in position to support the body at suitable points, although the number may be varied as desired.

Oil is preferably employed to charge the chambers, and a sufficient quantity is used to entirely fill the chamber 10 and partially fill the chamber 11, so that an air-space is left at the upper end of the chamber 11, such space being filled with compressed air. The piston 12 normally occupies a position near the top of the chamber 10, and the valve 25 is adjusted so as to partially close the passage 24.

When the piston 12 is subjected to sudden pressure, such as that caused by a jolt, it is moved downwardly, forcing the oil under the same up through the passage 24 and also past the valve 36 into the upper end of the chamber 10, and as the cross-sectional capacity of the cylinder 10 below the piston is greater than above the piston the excess oil discharged from under the piston will enter the chamber 11, compressing the air therein until the resistance of such compressed air is greater than the pressure on the piston 12 due to the impact, when the compressed air will force the piston upwardly to right the vehicle. It will thus be seen that the oil has upon the downward movement of the piston two passages by which it escapes to the upper end of the chamber 10. When, however, the vehicle rights itself, the upward movement of the piston is retarded, only one passage of escape of the oil above the piston being afforded, as the valve 36 will be closed, and this passage is restricted by the valve 25. It follows from this that although the downward movement of the load is relatively quick the jolt or impact is cushioned by the air in the chamber 11, while, on the other hand, the upward or rebound movement is slow and the vehicle merely restored to its normal righted position, so that the diminishing vibration ordinarily experienced when a vehicle runs over a rough road is practically eliminated.

Having described my invention, what I claim, and desire to secure by Letters Patent of the United States, is—

1. In a spring of the class described, the combination with a fluid-containing cylinder having a freely-movable reciprocating piston and an opening at each end, of automatic means for controlling the flow of fluid to retard the movement of the piston in one direction.

2. In a spring of the class described, the combination with a fluid-containing cylinder having a freely-movable reciprocating piston and an opening at each end, of an air-chamber in communication with one end of the cylinder, and automatic means for controlling the flow of fluid to retard the movement of the piston in one direction.

3. In a spring of the class described, the combination with a cylinder having a reciprocating piston and provided with passages communicating with the opposite ends of the cylinder, and an automatic valve in one of the passages for retarding the flow of fluid from the cylinder upon movement of the piston in one direction.

4. In a spring of the class described, the combination with a cylinder having a piston and provided with a passage communicating with the opposite ends thereof and an auxiliary passage also in communication with the opposite ends of the cylinder, and an automatic valve in the auxiliary passage.

5. In a device of the class described, the combination with a fluid-chamber having a freely-movable reciprocating piston located therein, means for conducting fluid to and from the fluid-chamber at opposite sides of the piston, an air-chamber communicating with the fluid-chamber, and an auxiliary passage in communication with the fluid-chamber and provided with a normally closed valve automatically opened upon the movement of the piston in one direction only.

6. In a device of the class described, the combination with a fluid-chamber provided with a piston and having a passage communicating at its ends with the opposite ends of the said chamber, an auxiliary passage for conducting fluid to one side only of the piston, an automatic valve controlling the auxiliary passage, and an air-chamber communicating with the fluid-chamber.

7. In a spring of the class described, the combination with a cylinder provided with a reciprocating piston and having an opening at each end and a passage communicating with one of such openings, of an auxiliary passage communicating with the end of the cylinder with which the first passage is in communication and having an automatic valve to close the auxiliary passage upon movement of the piston in one direction and to open such passage upon movement of the piston in the opposite direction, and an air-chamber also in communication with such end of the cylinder.

8. In a device of the class described, the combination with a fluid-chamber provided with a passage communicating with the opposite ends of the said chamber, a piston reciprocating in the fluid-chamber and having a stem passing through the top of the chamber, an attaching device pivotally connected to the end of the stem, cushion-springs at opposite sides of the piston, a regulating-valve in the passage, a check-valve-controlled passage communicating with the first-mentioned passage, and an air-chamber communicating at its lower end with the lower end of the fluid-chamber and from which the auxiliary passage opens.

In testimony whereof I affix my signature in presence of two witnesses.

BRUCE BORLAND.

Witnesses:
 ARTHUR B. SEIBOLD,
 ELIZABETH MOLITOR.